(12) United States Patent
Piel et al.

(10) Patent No.: US 7,172,160 B2
(45) Date of Patent: Feb. 6, 2007

(54) MECHANICAL MOUNTING CONFIGURATION FOR FLUSHMOUNT DEVICES

(75) Inventors: Kevin G. Piel, Ronkonkoma, NY (US); Robert S. Adonailo, Rockville Centre, NY (US); Christopher D. Martin, Plainview, NY (US); Thomas S. Babich, Glen Cove, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/975,786

(22) Filed: Oct. 28, 2004

(65) Prior Publication Data

US 2006/0091272 A1 May 4, 2006

(51) Int. Cl.
*G12B 9/00* (2006.01)
(52) U.S. Cl. .................. 248/27.1; 248/231.9
(58) Field of Classification Search ............ 248/231.9, 248/222.51, 222.52, 223.31, 488, 27.1, 27.3; 362/365, 366; 181/150
See application file for complete search history.

(56) References Cited

U.S. PATENT DOCUMENTS

| | | | | |
|---|---|---|---|---|
| 4,048,491 A | * | 9/1977 | Wessman | 362/364 |
| 4,211,905 A | * | 7/1980 | Quigley | 200/295 |
| 4,760,510 A | * | 7/1988 | Lahti | 362/365 |
| 4,860,369 A | * | 8/1989 | Koshimura et al. | 381/395 |
| 5,077,650 A | * | 12/1991 | Cestari | 362/365 |
| 5,314,148 A | * | 5/1994 | Jones | 248/27.3 |
| 5,331,119 A | * | 7/1994 | Leger et al. | 181/150 |
| 5,609,414 A | * | 3/1997 | Caluori | 362/366 |
| 5,964,523 A | * | 10/1999 | Eversberg | 362/365 |
| 6,241,368 B1 | * | 6/2001 | Depino | 362/364 |
| 6,588,543 B1 | * | 7/2003 | Tchilinguirian | 181/150 |

* cited by examiner

*Primary Examiner*—Anita M. King
(74) *Attorney, Agent, or Firm*—Scully, Scott, Murphy & Presser, P.C.

(57) ABSTRACT

A mechanical flushmount device for mounting to a panel, includes an enclosure for holding the component to be mounted, a flange at one end of the enclosure extending outward from the enclosure, at least one securing arm rotable from a closed position within the lateral extent of the flange to an open position at least partially beyond the lateral extent of the flange, and at least one actuator operable to rotate the at least one securing arm, said actuator being operable from a side of the flange opposite the securing arm.

9 Claims, 4 Drawing Sheets

MECHANICAL MOUNTING CONFIGURATION FOR FLUSHMOUNT DEVICES

BACKGROUND OF THE INVENTION

1. Field of Invention

The invention relates to the field of security devices and of construction materials and methods, and more particularly to a method and apparatus for mounting system components nearly flush to the surface of a wall, floor, or ceiling.

2. Description of Related Art

In the installation of security systems, and in construction in general, it is often desirable to mount sensors or other system components to be flush or nearly flush with the surface into which they are mounted. More specifically, security system components including sensors designed to detect heat, motion, sound, light, water, or the like, or input keypads, key cylinders or the like, are preferably mounted flush to a wall, ceiling, or other surface, in order to be inconspicuous and/or unobtrusive. Generally, those surfaces are walls comprised of wallboard and studs, or ceilings, specifically false or so-called 'drop' ceilings. Either surface proves challenging to provide a secure mount for the system components.

Accordingly, it is common to use one of two methods for installing system components flush with either a wall or ceiling. One is the installation of a single or double-gang electrical box behind the wall or ceiling surface, mounted to a stud or rafter behind the wall or ceiling, respectively. The system component is then secured within the electrical box. This method is time-consuming and increases installation costs accordingly. An alternative method is to mount the device with a friction fit into the panel of the wall or ceiling. While being generally quicker and more efficient, this method provides a less secure mount.

BRIEF SUMMARY OF THE INVENTION

Therefore it would be advantageous to provide a mechanical flushmount for devices that is both secure and installs quickly and easily. In order to overcome the foregoing and other weaknesses and deficiencies in the prior art, provided by the present invention are a method and apparatus for the mechanical mounting of devices flush with a surface to which they are mounted.

According to the present invention, provided is a mechanical flushmount device for mounting to a panel, the device comprising an enclosure for holding the component to be mounted, a flange at one end of the enclosure extending outward from the enclosure, at least one securing arm rotable from a closed position within the lateral extent of the flange to an open position at least partially beyond the lateral extent of the flange, and at least one actuator operable to rotate the at least one securing arm, said actuator being operable from a side of the flange opposite the securing arm.

In certain embodiments of the present invention one or more of the following can be provided: a stop limiting the rotation of the securing arm; the securing arm, in a closed position, generally conforming to the shape of the enclosure; the securing arm being flexible, arcuate, and/or varying in thickness in a plane perpendicular to its rotation.

BRIEF DESCRIPTION OF THE DRAWINGS

These and other features, benefits and advantages of the present invention will be made apparent with reference to the following specification and accompanying figures, wherein like reference numerals refer to like structures across the several views, and wherein.

DETAILED DESCRIPTION OF THE INVENTION

Figure 1B:
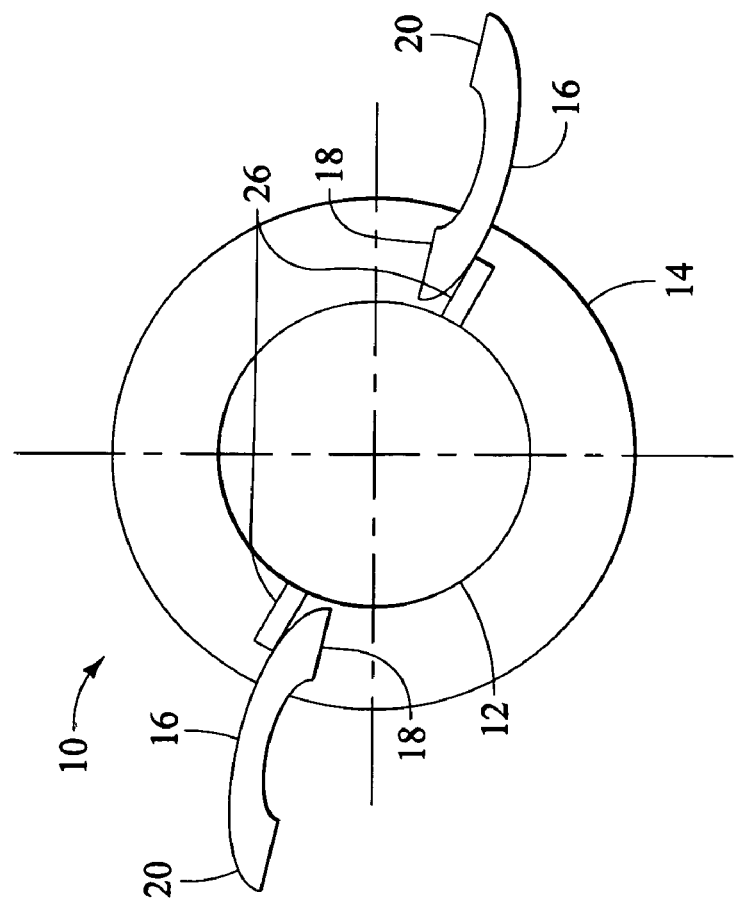
FIGS. 1A and 1B illustrate a rear view of a flushmount device according to an exemplary embodiment of the present invention in closed and maximum opened positions, respectively.
Figure 1A:
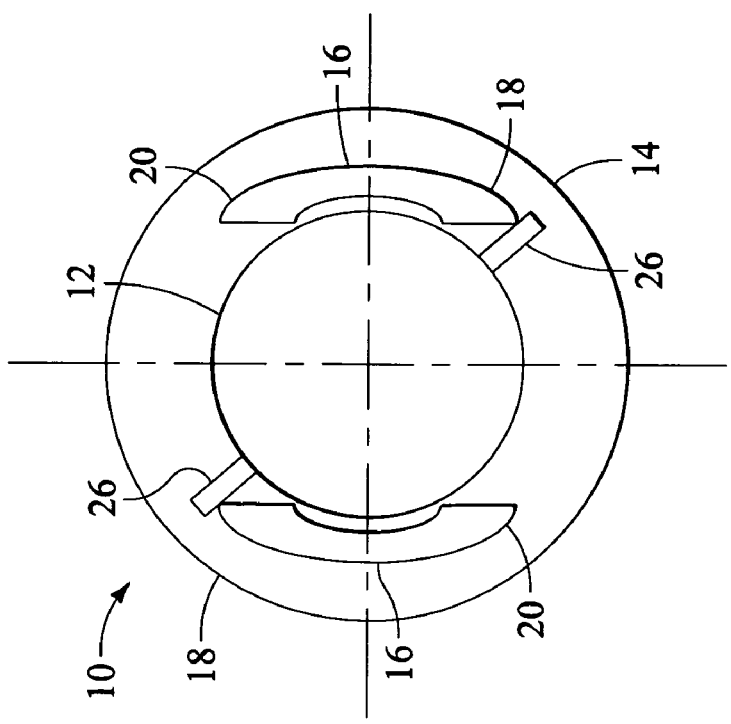

Referring now to FIGS. 1A and 1B, shown is a rear view of a flushmount device, generally 10, according to an exemplary embodiment of the present invention in closed and opened positions, respectively. Flushmount device 10 comprises an enclosure 12, in which or to which a system component would be held or secured, respectively. In this embodiment, the enclosure 12 is cylindrical, though other shapes, including but not limited to triangular, square or rectangular or other prismatic shapes, or irregular shapes, are suitable as well.

Connected with the enclosure 12 at one end thereof is a flange 14 that extends outward from the enclosure 12. In the exemplary embodiment, the flange 14 is similar in shape to the enclosure, but this need not be the case. The flange covers the opening 24 (see FIG. 3) in a panel 22 (see FIG. 3) supporting the flushmount device 10. Connected with the enclosure 12 are one or more securing arms 16, two in the exemplary embodiment. Each securing arm 16 has a proximal end 18 and a distal end 20. The proximal end of each securing arm 16 is connected to the enclosure 12 in a manner such that the securing arm is able to rotate from a closed position, illustrated in FIG. 1A, to an open position, illustrated in FIG. 1B. A closed position is defined by the securing arm 16 being rotated to a position adjacent the enclosure 12. An open position is defined by the securing arm 16 being rotated to a position outward from the enclosure 12.

In the exemplary embodiment, the securing arms 16 are generally curved, as viewed in FIGS. 1A–B, 2A–B, to match or approximate the shape of the enclosure 12. In this configuration, the flushmount device 10 requires a smaller opening 24 in panel 22 than, for example, if securing arms 16 were straight and enclosure 12 curved. Located on the flushmount device 10 is at least one stop 26, two in the illustrated embodiment, one corresponding to each securing arm 16, adjacent a respective securing arm 16. The stop 26 limits the rotation of securing arm 16 to a maximum opened position, illustrated in FIGS. 1B, 2B.

Figure 2B:
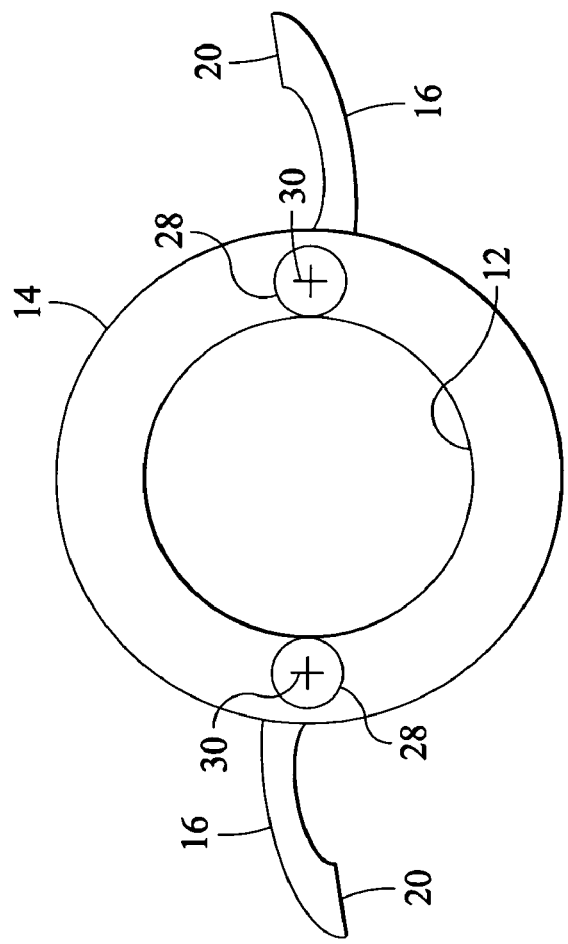
FIGS. 2A and 2B illustrate a front view of a flushmount device according to an exemplary embodiment of the present invention in closed and maximum opened positions, respectively.
Figure 2A:
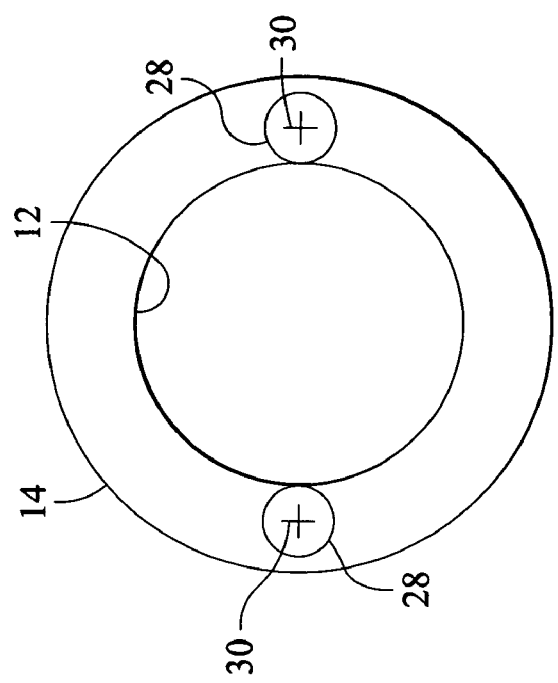

Referring now to FIGS. 2A, 2B, illustrated in front view is a flushmount device 10 according to an exemplary embodiment of the present invention in closed and maximum opened positions, respectively. Shown on the face of the flushmount device 10 are pins 28, one associated with each securing arm 16, each being operatively connected to a respective securing arm 16. The pins 28 have a surface feature 30, for example a Phillips head slot. In other embodiments, a flat-head slot, a raised or depressed hexagonal or other polygonal structure, TORX feature, or the like as known in the art, can be substituted. Alternately or additionally, an integral or separable lever can be provided to actuate the pin 28.

Figure 3:
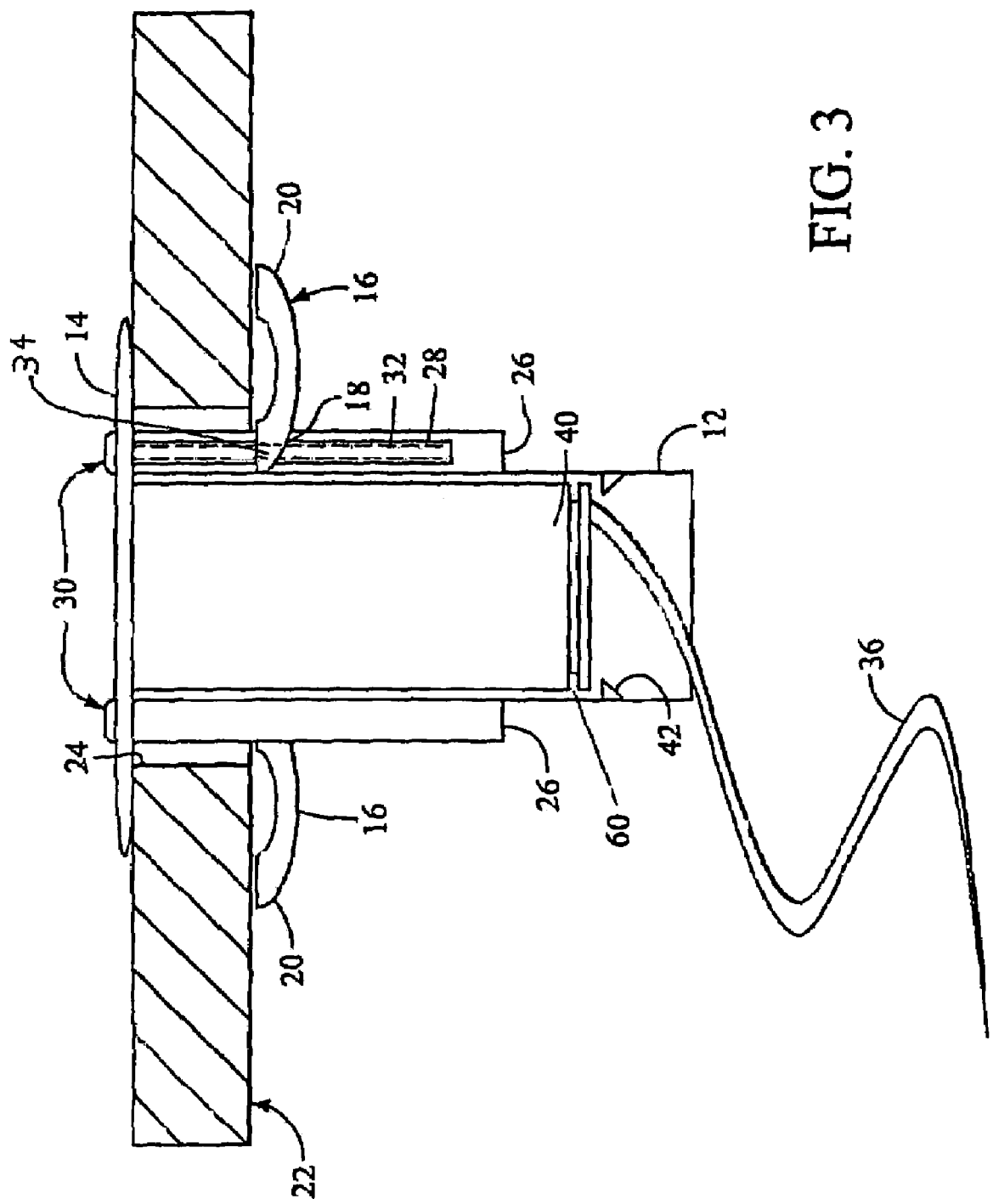
FIG. 3 illustrates a lateral cross-section view of a flushmount device according to an exemplary embodiment of the present invention in an opened position.

Referring now to FIG. 3, illustrated in side view is a flushmount device according to an exemplary embodiment of the present invention in an opened position. Any of a variety of sensors of system components, generally 40, can be mounted in or to the enclosure 12. In the exemplary embodiment, the enclosure 12 includes a resilient tab 42 to retain the component. Wiring 36 can be seen exiting from the component 40. Alternately, the component and enclosure 12 can be provided with cooperating tab 42 and slot 60 systems to retain the component, or the component can be friction fit within enclosure 12, or other suitable mounting arrangement.

The operation of the flushmount device will now be explained in additional detail. In the illustrated embodiment, pin 28 has a threaded exterior 32, and passes through a complementary threaded hole 34 in a respective securing arm 16. In this embodiment, the securing arm 16 is free to rotate with the pin 28, to the extents permitted between the stop 26 and the enclosure 12. When rotating from an open to a closed position, securing arm swings from adjacent the enclosure 12 to contact the stop 26. Further rotation of the pin 28 draws the securing arm 16 closer to the flange 14, grasping the panel 22 between the flange and the securing arm 16.

In alternate embodiments, pin 28 and securing arm 16 are fixed to one another, with or without screw thread. The securing arm is positioned to engage a panel of predetermined thickness. Alternately in either embodiment, the securing arm 16 may be flexible to account for panels of varying thickness. They may be curved as viewed from the side, as in FIG. 3, to promote flexure, either concave relative to the panel 22, as shown, or convex.

Figure 4:
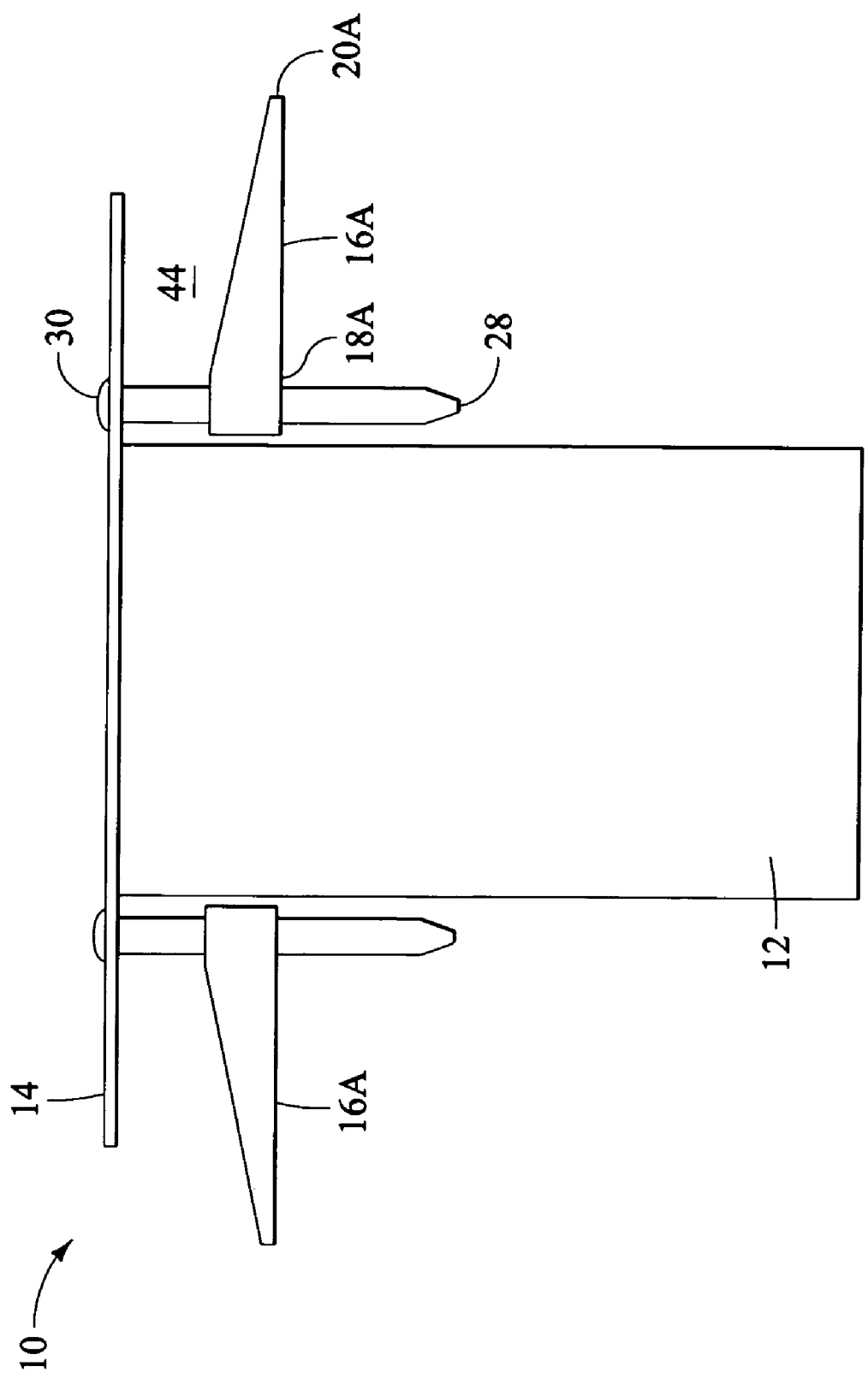
FIG. 4 illustrates a lateral cross-section view of a flushmount device according to an alternate embodiment of the present invention in an opened position.

In yet another embodiment, illustrated in FIG. 4, securing arm 16A may be tapered from a thick portion at a proximal end 18A to a thin portion at a distal end 20A, in order to provide an increased amount of clearance space 44 between the securing arm 16A and flange 14 at a distal end 20A. Accordingly in such an embodiment, the securing arm 16A would engage a thicker panel 22 with less rotation of the pin 28 than for a correspondingly thinner panel. The precise amount of rotation necessary would vary, allowing an embodiment of the flushmount device 10 including this feature to adapt to different applications and panels of varying thickness.

The present invention has been described herein with reference to certain exemplary and/or preferred embodiments. Certain alterations or modification may be apparent to those skilled in the art, in light of the present disclosure, without departing from the scope of the invention. These embodiments are meant to be illustrative, and not limiting, on the scope of the present invention, which is defined with reference to the appended claims.

The invention claimed is:

1. A mechanical flushmount device for mounting to a panel, the device comprising:
   an enclosure for holding a component to be mounted;
   a flange at one end of the enclosure extending outward from the enclosure;
   at least one securing arm rotable from a closed position within a lateral extent of the flange to an open position at least partially beyond the lateral extent of the flange; and
   at least one actuator operable to rotate the at least one securing arm, said actuator being operable from a side of the flange opposite the securing arm, wherein the at least one securing arm has a variable thickness.

2. The mechanical flushmount device according to claim 1, further comprising at least one stop limiting the rotation of the at least one securing arm.

3. The mechanical flushmount device according to claim 1, wherein said at least one securing arm comprises two securing arms.

4. The mechanical flushmount device according to claim 3, wherein said two securing arms are positioned opposite one another with respect to the enclosure.

5. The mechanical flushmount device according to claim 1, wherein in the closed position, the at least one securing arm generally conforms to the shape of the enclosure.

6. The mechanical flushmount device according to claim 1, wherein the at least one variable thickness securing arm has increased clearance space from the flange at a distal end thereof.

7. A mechanical flushmount device for mounting to a panel, the device comprising:
   an enclosure for holding a component to be mounted;
   a flange at one end of the enclosure extending outward from the enclosure;
   at least one securing arm rotable from a closed position within a lateral extent of the flange to an open position at least partially beyond the lateral extent of the flange; and
   at least one actuator operable to rotate the at least one securing arm, said actuator being operable from a side of the flange opposite the securing arm, wherein the at least one securing arm is flexible in a plane perpendicular to its rotation.

8. A mechanical flushmount device for mounting to a panel, the device comprising:
   an enclosure for holding a component to be mounted;
   a flange at one end of the enclosure extending outward from the enclosure;
   at least one securing arm rotable from a closed position within a lateral extent of the flange to an open position at least partially beyond the lateral extent of the flange; and
   at least one actuator operable to rotate the at least one securing arm, said actuator being operable from a side of the flange opposite the securing arm, wherein the at least one securing arm is arcuate along at least part of a length of the arm as viewed in a direction perpendicular to its plane of rotation.

9. A mechanical flushmount device for mounting to a panel, the device comprising:
   an enclosure for holding a component to be mounted;
   a flange at one end of the enclosure extending outward from the enclosure;
   at least one securing arm rotable from a closed position within a lateral extent of the flange to an open position at least partially beyond the lateral extent of the flange; and
   at least one actuator operable to rotate the at least one securing arm, said actuator being operable from a side of the flange opposite the securing arm; and means to retain a component to be flushmounted comprising one of a resilient tab and a cooperating tab and slot system.

* * * * *